United States Patent

[11] 3,616,100

[72] Inventor Yoshio Morita
c/o Koppers Company Inc., 440 College Park Drive, Monroeville, Pa. 15146
[21] Appl. No 782,406
[22] Filed Dec. 9, 1968
[45] Patented Oct. 26, 1971
[32] Priority Dec. 29, 1967
[33] Japan
[31] 42/84378
Continuation-in-part of application Ser. No. 752,315, Aug. 13, 1968.

[54] MULTICOLOR IRIDESCENT PLASTIC PRODUCT CONTAINING CRESCENT SHAPED NACREOUS PIGMENT LAYERS
3 Claims, 6 Drawing Figs.
[52] U.S. Cl......... 161/5, 161/1, 161/6, 264/75
[51] Int. Cl... B44f 1/04, B44f 1/14

[50] Field of Search......... 161/1, 5, 6; 264/108, 73, 74, 75

[56] References Cited
UNITED STATES PATENTS
3,410,934  11/1968  Kuritzkes et al............  264/74

Primary Examiner—John T. Goolkasian
Assistant Examiner—M. E. McCamish
Attorneys—James E. Armstrong, III and Olin E. Williams ABSTRACT: A light-transmitting plastic resin sheet capable of exhibiting intense multicolor effects is provided. The sheet has positioned therein individual layers of at least two optically colored nacreous pigments of different optical color. The pigment crystals within an individual layer are oriented in parallel spaced relationship with respect to each other. The individual layers are positioned at an angle to each other so that the color transmitted by one of the layers intensifies the purity of the color reflected by another of the layers.

INVENTOR.
YOSHIO MORITA
BY J.E. Armstrong
his Attorney

PATENTED OCT 26 1971 3,616,100

INVENTOR.
YOSHIO MORITA
BY J.E. Armstrong
his Attorney

MULTICOLOR IRIDESCENT PLASTIC PRODUCT CONTAINING CRESCENT SHAPED NACREOUS PIGMENT LAYERS

REFERENCE TO RELATED APPLICATIONS

This application is a continuation-in-part of my copending application Ser. No. 752,315, filed Aug. 13, 1968.

BACKGROUND OF THE INVENTION

It is well known that the reflection of light from thin films or platelet crystals of certain uniform optical thickness produce color by optical interference. The predominent color of the reflected light is related to the optical thickness of the film or platelets. Colored iridescent nacreous platelet pigments give their characteristic luster and color to materials to which they are applied, whether application is done by coating or by incorporation. Iridescent nacreaus pigments are used primarily in making simulated pearls. Direct incorporation into plastics, such as by casting, has been tried, but is less common.

The colored iridescent pigments have had mixed acceptance in the plastics field because of their lower luster and color intensity in comparison with competing materials. Pigments made from the thinner platelet crystals that reflect essentially white light show far stronger luster than the colored pigments, and most layered films of bismuth oxychloride, zinc sulfide, or titanium dioxide show better intensity and purity of color than the platelet pigments.

Mattin, in U.S. Pat. No. 3,219,734, describes a method of making multicolor plastic laminates containing individual layers of parallel oriented optically colored platelet crystals. The individual layers are parallel to each other and contain platelets of different optical color. The platelets within a given layer are also oriented parallel to each other. Unfortunately, in castings made by the Mattin method there is a considerable degree of overlapping; i.e., the mixing of complementary colors to produce white light. Because of the overlapping, little or no color is seen from certain angles of observation and the purity of the reflected color is considerably reduced. Another attempt at multicolor effect in plastics is described by Bolomy in U.S. Pat. No. 3,231,645. Bolomy, using a rotating casting cylinder, produces helical patterns in parallel planes which may be directly parallel to each other or which may intersect each other. Bolomy produces a plastic sheet having multicolor linear striations in which the colors are somewhat subdued because of the overlapping of reflected light of pigments that reflect complementary colors.

Unfortunately, the prior attempts to produce multicolor effects do not, because of overlapping and lack of color purity, correspond in aesthetic appearance to the multicolor effect seen in natural mother-of-pearl or other shells.

SUMMARY

I have discovered cast resin material which, because of the substantial elimination of overlapping and the intensification of color purity, approaches the appearance of the natural mother-of-pearl.

In accordance with the invention a light-transmitting resin sheet exhibiting intense multicolor effects has positioned therein individual layers of at least two optically colored pigments of different optical color. The individual layers consist essentially of substantially uniform crystalline platelets, the platelets being characterized by strong reflectance and weak transmittance of incident light and by reflectance of a single color by optical interference phenomena. The platelets within an individual layer are oriented in parallel spaced relationship with respect to each other. The individual layers are positioned at an angle of 5–60°, preferably 30–45°, with respect to each other so that the color transmitted by one of the layers intensifies the purity of the color reflected by another of the layers.

BRIEF DESCRIPTION OF THE DRAWINGS

Referring to FIG. 1, layer 15, disposed in transparent plastic sheet 14, is composed of thin platelet crystals of uniform thickness that, because of optical interference phenomena, will separate white light 13 from a source 11 into a pink reflected ray 17 and a green transmitted ray of unequal brightness. Layer 16 is composed of thin platelet crystals of a different optical color selected so that they will reflect green light 18 and transmit pink light. When, in accordance with the invention, the two layers are arranged at varying angles to each other within a light-transmitting resin sheet 15, they appear iridescent regardless of the angle of observation from eye 12. The light of green wavelength transmitted by the first layer is reflected by the second, and repassage of the reflected light from the second layer through the first layer will intensity the green color even further. If the two reflecting layers were parallel to each other, substantially all of the pink and green rays would combine to produce white light and little or no iridescent color would be seen. The maximum light reflection from each layer is governed by the angle of incidence of incoming illumination.

FIG. 2 shows the principle of my invention according to a diagram of classical physics. FIG. 3, also a diagram of classical physics, is presented to show the effect of parallel positioning of the layers. In each of the figures the first layer G is green reflecting and the second layer R reflects the complementary color, red.

In FIGS. 2 and 3 the images of the light source L by green and red iridescent layers G,R are observed simultaneously as $L_g$ and $L_r$, respectively. In FIG. 3, where the layers are parallel, the distance between $L_g$ and $L_r$ depends upon the distance separating the two films. Because this distance is very small, the overlapped part of the images $L_g$ and $L_r$ is quite large when compared to the total image. Complete overlap or simultaneous observation of $L_g$ and $L_r$ gives no color. As seen in FIG. 2, if the layers are not parallel to each other, the distance of the two images increases as the angle between the two films increases and finally the images are separated completely from each other. In this case the two colors no longer overlap and individual red and green images are clearly seen.

FIG. 4 is a cross-section of a nozzle mouth plate arrangement for making a multicolored casting by the method described and claimed in my copending application Ser. No. 752,315, filed Aug. 13, 1968. FIG. 4 shows dual extrusion nozzle mouth 21 in which there are positioned thin plates 22 for extruding two different resins, each containing crystals of different optical color. The dual nozzle provides an extrusion having crystals of the same optical color oriented parallel to each other in individual layers; the individual layers of crystals being arranged in non-parallel spaced relationship with respect to each other according to the invention.

FIG. 5 shows a cross section of an extruded product according to example II from a long cylindrical nozzle in which there are positioned two curved slit nozzles. The extruded product is a rod composed of clear cast plastic 24 having disposed therein internal curved pigmented portions 25 and 27. The parallel layers of crystals 26 and 28 within the pigmented portions are disposed in a changing angular relationship defined by the tangents to the curved surfaces.

FIG. 6 shows a multilayer casting according to example III. The top layer 31 contains blue-reflecting crystals oriented parallel to each other, the intermediate layer of clear cast plastic 32 has one smooth and one irregular surface and the lower layer 33 contains a layer of gold-reflecting pigments oriented parallel to the irregular surface of the intermediate layer of clear plastic. Thus, the gold and blue layers are nonparallel with respect to each other, the angular relationship between the layers changing with the parts of the curved surface.

DETAILED DESCRIPTION

Figure 2:
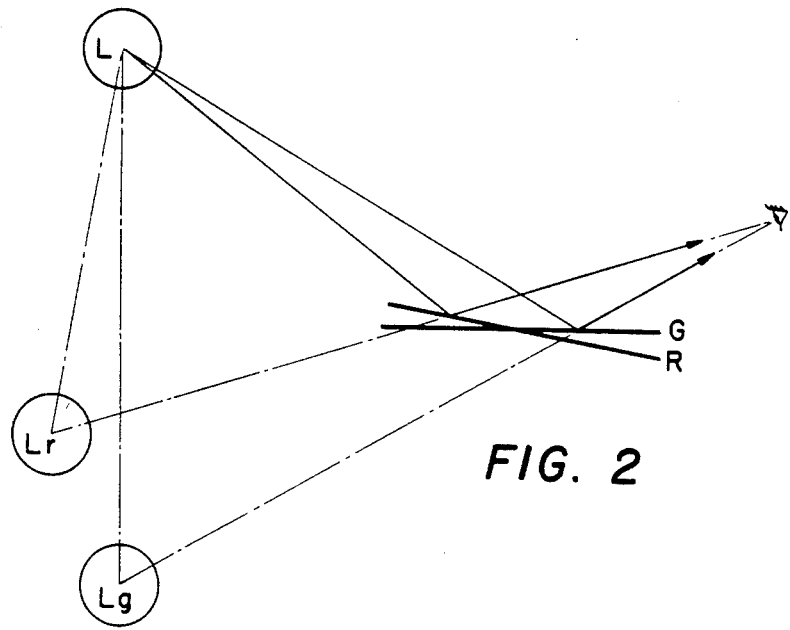
FIG. 2 is a classical physics diagram illustrating the reduction or elimination of overlapping according to the method of my invention.
Figure 3:
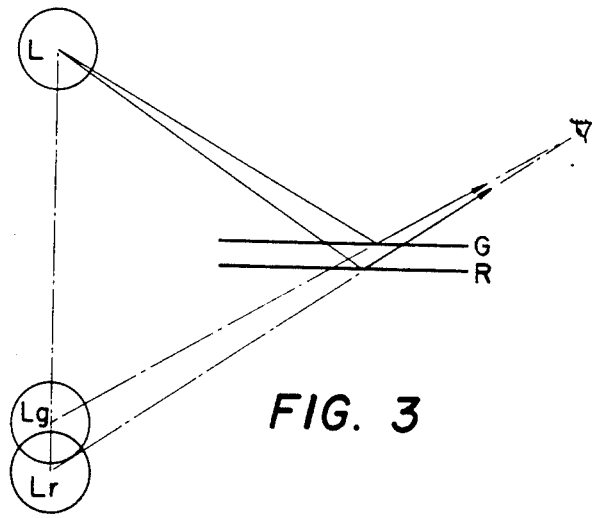
FIG. 3 is a classical physics diagram illustrating the optical effect according to the known method of positioning the layers of parallel oriented crystals parallel to each other.

The iridescent nacreous pigments used in the preparation of the iridescent plastics of the invention were first described by Dr. Sei Hachisu in an article entitled "Pearl Pigment II," which appeared in the Journal of Color, Vol. 32 No. 3, Mar. 1959. The iridescent pigments consist of tiny crystalline platelets of lead salts, such as basic lead carbonate, lead hydrogen arsenate, lead hydrogen phosphate, and lead iodide. These lead salts have an index of refraction range between about 1.8 and 2.1; e.g., basic lead carbonate, 1.94–2.09; lead hydrogen phosphate, 1.84; and lead hydrogen arsenate 1.90–1.97. The optical thickness (thickness in m$\mu$ multiplied by the index of refraction) of the iridescent platelets ranges between about 180 and 2,000 m$\mu$. In addition to the lead salts, other available iridescent pigments include titanium-coated mica flakes, titanium-coated glass flakes, and those materials described in Mattin patent, U.S. Pat. No. 3,219,734.

The iridescent crystals assume color because of optical interference phenomena. Those crystals having an optical thickness in the range of 180–200 $\mu$ are yellow to gold in color; those having an optical thickness of 240 m$\mu$ are red; and those in the range of 300–400 m$\mu$ are blue to green. At an optical thickness of 600–640 m$\mu$, the yellow color is once again obtained, this being the second order of interference. Although iridescent pigments having an optical thickness of up to 2,000 m$\mu$ can be used for purposes of the invention, those crystals of the first order of interference, with an optical thickness of 180–400 m$\mu$ are preferred, because better luster is produced by thinner crystals.

The amount of pearl added to the light-transmitting resin material can be varied between about 0.05–5 percent, depending upon the shape and thickness of the product being cast and the quality of the pigment being used. Best results are obtained using from 0.1–1 percent be weight of the iridescent pearlescence.

Light-transmitting resin materials useful in the invention are well recognized in the art of making pearlized plastics, as illustrated by the teachings of U.S. Pat. Nos. 2,971,223 and 3,046,610, issued to Louis Grunin. Useful materials include any resin or mixture of resins that can be polymerized with ultra-violet light with or without the use of suitable catalysts. Examples of these resins are polyester resins, which comprise a cross-linking vinyl monomer and an unsaturated polyester or alkyd formed by condensing and esterifying a polyhydric alcohol and a polycarboxylic acid. Various materials containing ethylenic linkages, such as divinylbenzene, diallylphthalate, diallylmalonate, allylmethacrylate, diallylcarbonate, triallylcyanurate, tetrallylsilane, or copolymers of these materials, can be used. Monoethylenic resin-forming materials, such as methylmethacrylate and styrene, are also useful. Condensation polymers suitable for casting include epoxy resins, phenol-formaldehyde resins, and melamine.

In the case of polyester resins, typical commercial mixes of useful viscosity contain about 80 percent by weight of polyester and 20 percent by weight of styrene or other suitable diluent and usually a trace of inhibitor, for instance 0.5 percent hydroquinone, to prevent temporarily the setting of the resin mix before use. The styrene or diluent content of the resin mix can vary between about 10 and 40 percent. As the amount of diluent is increased, the viscosity of the mix is lowered and some preheating may be required to bring the viscosity within the useful range.

There are many methods of obtaining the necessary orientation of platelets and angular arrangement of the individual layers of platelets according to the invention. One convenient method is the continuous casting procedure described and claimed in my copending application Ser. No. 752,315. In that method a liquid plastic mixture of the light-transmitting resin and the iridescent pearlesence is passed through an extruder containing a plurality of thin plates in a prearranged spaced relationship for orienting the pearlesence within the resin. A twin extrusion nozzle is used and the thin plate arrangements in each of the nozzlemouths are positioned to create an angle between the individual layers of the final casting. The combined extrudate is covered on each side by plastic films to insulate it from the open air, and is passed continuously past a heat source to solidify the resin and fix the orientation of the pearlesence.

Another method of achieving the multicolor effect of the invention involves extruding three kinds of resin syrup through a three fluid nozzle; one of the syrups being clear, another containing iridescent crystals of one optical color, and the other iridescent crystals of a second optical color, preferably the complementary color. The two inner nozzles of the three fluid nozzle are positioned at an angle to each other so that the individual layers of crystals will be nonparallel to each other.

The multicolor plastic of the invention can also be made by introducing syrups containing iridescent pigment of a different optical color into individual chambers of a multicavity mold, the chambers being arranged to create a nonparallel relationship between the individual layers of pearl pigment. Orientation is accomplished by a conventional vibration technique or by the method described in Japanese patent SHOWA 38-7477.

In the multicolor plastics of the invention the iridescent color changes as the direction of observation changes. The change is common both to color phase and to color purity. As the angle of observation is decreased from an angle perpendicular to the surface of the object, the color changes in the direction of decreasing optical thickness and the color purity decreases.

The angle between the individual layers of parallel oriented pearl pigment is of extreme importance with respect to the optical effect achieved. If two layers of crystals of complementary color are used and the angle between the individual layers is less than 5°, there is almost complete overlap and therefore little or no visible color. If the angle between the layers is greater than 60°, there is only a narrow angle of observation from which the multicolor effect can be seen. Naturally, it is desirable for the finished article to have a lustrous iridescent appearance from every angle of observation. If the available angle of observation is narrow, parts of the finished article appear lustrous and other parts do not shine. The optimum angle between the individual layers to provide the greatest available angle of observation varies between 30 and 45°. A most desirable color effect is achieved from a changing angle of the individual layers of crystals, such as is achieved when the layers are curved. In such a case, the angle between the individual layers changes constantly along the curved surfaces.

The method of manufacture can be designed to vary the angular relationship of the two reflecting layers over the total surface. The predominant color at any point will thus also vary. As explained above, the angle of viewing will change the optical path thickness of the platelets and thus very slightly modify the dominant color reflected. As a result of these factors, it is possible to make cast plastic articles with multicolored iridescent effects very much like those seen in mother-of-pearl. The colors will change with every change in direction of observation. Adjacent color enhancement, which is achieved by color contrast, is a byproduct of the multicolored effect of my invention. Since, according to my invention, the upper layer intensifies the color purity of the light waves reflected by the lower layer, a stronger color contrast between adjacent colors will be produced. This strong contrast gives the color effect of adjacent color enhancement.

My invention is further illustrated by the following examples:

EXAMPLE I

Separately, two 100 kg. quantities of polyester resin, 77 percent of a butylene glycol-maleate-sebacate polyester containing an equal ratio of acid components in 23 percent styrene, having a viscosity of 12,000 poises at 25° C. are each stirred with 0.5 and 1.0 kg. respectively, of iridescent basic lead carbonate nacreous pigment (crystal concentration 50 percent) of different optical color (one blue-green, one pink) for thirty minutes to obtain uniform dispersions. To each of the dispersions are added cobalt naphthenate (a styrene monomer solution containing 10 percent by weight as cobalt) in an amount of 0.005 kg. and methylethyl ketone peroxide (as a 60 percent solution in dibutylphthalate) in an amount of 0.05 kg. The solutions are stirred for about 30 minutes, then charged into storage tanks. With the control valves closed, air is removed from the tanks by applying a reduced pressure of about 0.1 atmosphere for about twenty minutes. After the air bubbles are completely eliminated, high-pressure air is introduced into the tanks to maintain the internal pressure at 1.5 atmospheres. The control valves are then carefully opened to allow the resin stock to flow to the mixing tubes of a twin extrusion nozzle.

Figure 4:
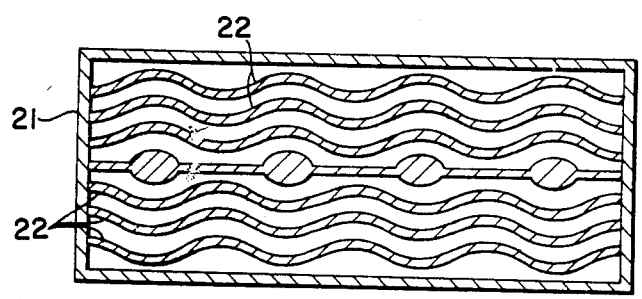
FIG. 4 is a nozzle mouth plate arrangement for making a casting according to the invention.
Figure 1:
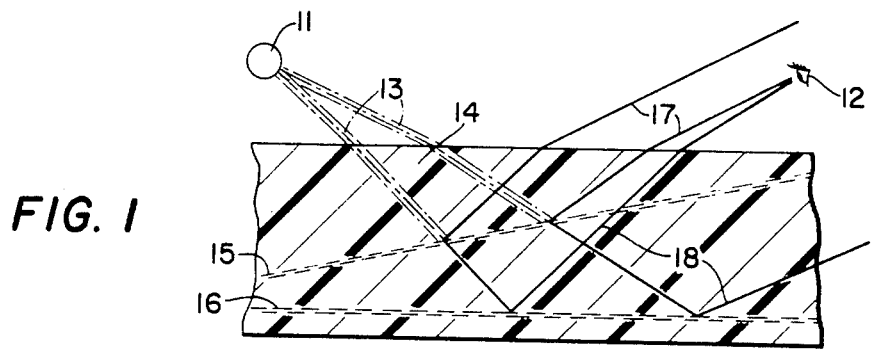
FIG. 1 shows the principle of my discovery in which two layers of parallel oriented iridescent pigments of different optical color are positioned at an angle with respect to each other.

The nozzle mouths of the twin nozzle are fitted with a plate arrangement as shown in FIG. 4 of the drawings. The resins are formed as a sheet flow by passing through the forming parts of the twin extruder. The flow rate of the resins to the mixing tubes are adjusted so as to maintain a linear extrusion speed of 50 centimenters per minute. The platelet particles of the iridescent pigment are forced to be oriented by the passage of the resin through the thin plates positioned in the mouth nozzles. As the extrudates leave the twin extrusion nozzles, they are formed into a laminate which is immediately covered on both sides with polyethylene film and transferred onto a conveyor belt. The set form of the extrusion is maintained by the special shape of the conveyor rolls and the receiving station. The resin, covered with the polyethylene films, is brought adjacent infrared lamps serving as a heat source by the synchronized movements of the films and the conveyor. The infrared lamps heat the resin at 35° C., which is a temperature sufficient to cause gelation as the encased resin travels the length of the five meter belt. The solidified resin is carried by driving rolls to a table ten meters in length where it is heated to a slightly higher temperature of 38-40° C. to accelerate solidification. Following the table, a conventional type button blanking machine is placed and the resin is still sufficiently soft to be punched into blanks. Curing of the blanks is done by known means and the film residues are removed by a conventional air separator. The resulting button blanks show multicolor iridescent effect; green, pink, and blue colors appearing according to the angle of observation, as in the natural mother-of-pearl. Color intensification in multicolor castings is achieved by the orientation of the different blue-green crystals oriented parallel to each other in one plane and pink crystals oriented parallel to each other in a second plane not parallel to the first. This effect is achieved using the thin plate arrangement of FIG. 4.

EXAMPLE II

Figure 5:
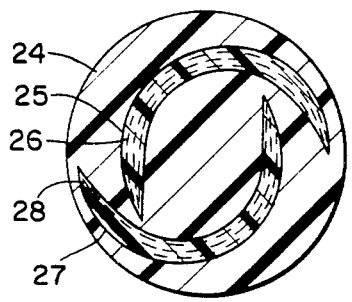
FIGS. 5 and 6 show simple castings illustrating the product of the invention.

A long cylindrical nozzle in which there are positioned two curved slit nozzles is used for the extrusion of acrylic syrups (methylmethacrylate monomer approximately 50 percent polymerized) of a viscosity of about 20,000 cps. Three separate syrups are prepared; one being clear and the other two containing pink and green iridescent pearl pigment, respectively. The three syrups are simultaneously extruded. The one containing the pink iridescent platelets is passed through one slit nozzle, the one containing the green iridescent platelets through another slit nozzle and the clear syrup through the surrounding cylinder nozzle. The mold is a long glass pipe preliminarily capped on the cylinder nozzle and moved away with speed synchronzied to the linear speed of the extrusion. The end sections of the slit nozzles are arranged at a changing angle with respect to each other, defined by the tangents to the curved surfaces. The iridescent acrylic rod obtained by this procedure shows a lustrous green line adjacent to a beautiful pink shining line, and these interchange as the angle of observation changes. A cross section of the extruded product is shown in FIG. 5 of the drawings.

EXAMPLE III

Figure 6:
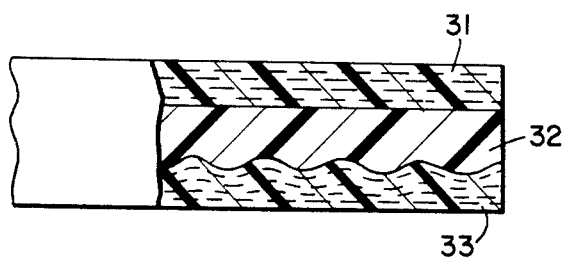

A waved panel is used for one side of a mold to give waved surface to a cast polyester sheet. A glass plate and a waved panel are combined so as to form a plate mold with spacer gaskets between the glass plate and the panel. With this semiwaved mold, clear polyester is cast and cured. The cast resin has one flat face and the other waved. This polyester is set between two glass plates with spacer gaskets to form cavities on both sides of the polyester plate. Each cavity is filled with polyester syrup containing respectively blue and gold iridescent pigments, and during solidification of the resin, the crystals are oriented using a conventional vibration technique. The individual resin syrups have a viscosity of 18,000 cps., and contain one percent catalyst, 60 percent methylethyl ketone peroxide in styrene monomer, and 10.5 percent of promotor (cobalt naphthenate as a 10 percent solution of cobalt). The resulting article is removed from the glass plates to provide a finished casting showing golden striations on a background of deep blue. A sectional view of the finished article is shown in FIG. 6.

I claim:

1. A light transmitting resin product capable of exhibiting intense multicolor effects, comprising an extruded light transmitting resin with at least two individual layers of different optically colored nacreous pigments consisting essentially of substantially uniform crystalline platelets characterized by strong reflectance and weak transmittance of incident light and by reflectance of a single color by optical interference phenomena, said individual layers being crescent shaped, having been extruded simultaneously with said resin through thin crescent shaped openings which orient the nacreous crystalline platelets to render them parallel within each of said layers while contained in said resin, wherein said individual layers are positioned in angular relationship with respect to each other with the angle therebetween falling within the range of 5-60°

2. A resin product according to claim 1 wherein there are two individual layers of different optically colored narcreous colors which are complementary.

3. A resin product according to claim 1, wherein said extruded light transmitting resin is in the form of a rod.

* * * * *